United States Patent [19]
Soeya et al.

[11] Patent Number: 5,436,777
[45] Date of Patent: Jul. 25, 1995

[54] MAGNETORESISTIVE HEAD

[75] Inventors: Susumu Soeya, Hitachiota; Shigeru Tadokoro; Takao Imagawa, both of Hitachi; Eiji Ashida, Hitachiota; Moriaki Fuyama, Hitachi; Shinji Narishige, Mito; Kouichi Nishioka, Hiratsuka, all of Japan

[73] Assignee: Hitachi, Ltd., Tokyo, Japan

[21] Appl. No.: 941,248

[22] Filed: Sep. 4, 1992

[30] Foreign Application Priority Data

Sep. 4, 1991 [JP] Japan .................. 3-224346

[51] Int. Cl.⁶ ........................................... G11B 5/39
[52] U.S. Cl. ........................................... 360/113
[58] Field of Search ............ 360/110, 113, 125, 126; 29/603; 427/130, 131; 324/252; 338/32 R

[56] References Cited

U.S. PATENT DOCUMENTS

| | | | |
|---|---|---|---|
| 4,103,315 | 7/1978 | Hempstead et al. | 360/113 |
| 4,663,685 | 5/1987 | Tsang | 360/113 |
| 4,771,349 | 9/1988 | Tsang | 360/113 |
| 4,809,109 | 2/1989 | Howard et al. | 360/113 |
| 4,825,325 | 3/1989 | Howard | 360/113 |
| 4,940,511 | 7/1990 | Fontana, Jr. et al. | 360/113 |
| 5,005,096 | 3/1991 | Krombi et al. | 360/113 |
| 5,014,147 | 5/1991 | Parkin et al. | 360/113 |
| 5,079,035 | 1/1992 | Krombi et al. | 360/113 |
| 5,206,590 | 3/1993 | Dieny et al. | 360/113 |

*Primary Examiner*—Robert S. Tupper
*Assistant Examiner*—Paul J. Ditmyer
*Attorney, Agent, or Firm*—Antonelli, Terry, Stout & Kraus

[57] ABSTRACT

A magnetoresistive head has a substrate (1) and, on the substrate, a magnetoresistive film (40) for converting a magnetic signal into an electric signal by using magnetoresistance effects and a pair of electrodes (60) for causing a signal detection current to flow through the magnetoresistive film. A pair of first domain wall suppressing layers (30) are arranged at opposite end portions of the magnetoresistive film, respectively, to apply a longitudinal magnetic bias to the magnetoresistive film. A second domain wall suppressing layer (45) is also provided for applying a longitudinal magnetic bias, which is weaker compared with the longitudinal magnetic bias applied by the first domain wall suppressing layers, to the magnetoresistive film (40).

26 Claims, 9 Drawing Sheets

AIR BEARING SURFACE SIDE

AIR BEARING SURFACE SIDE

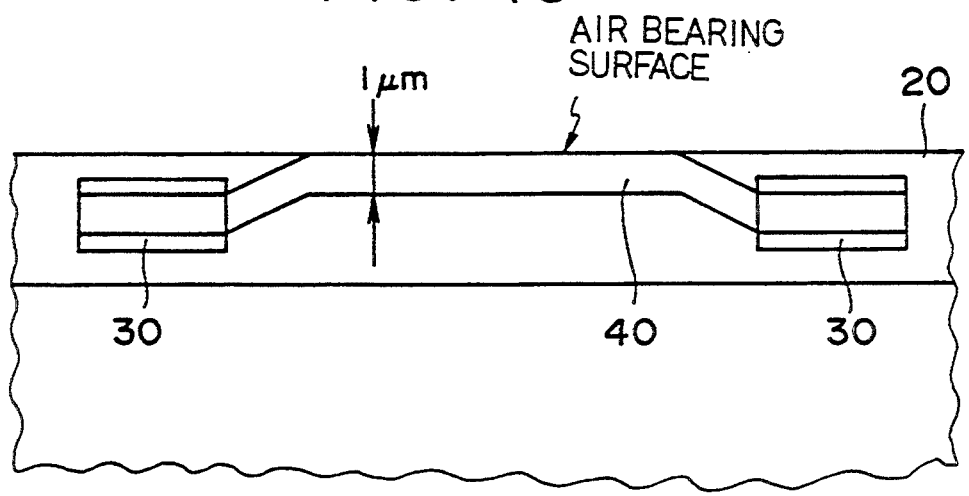
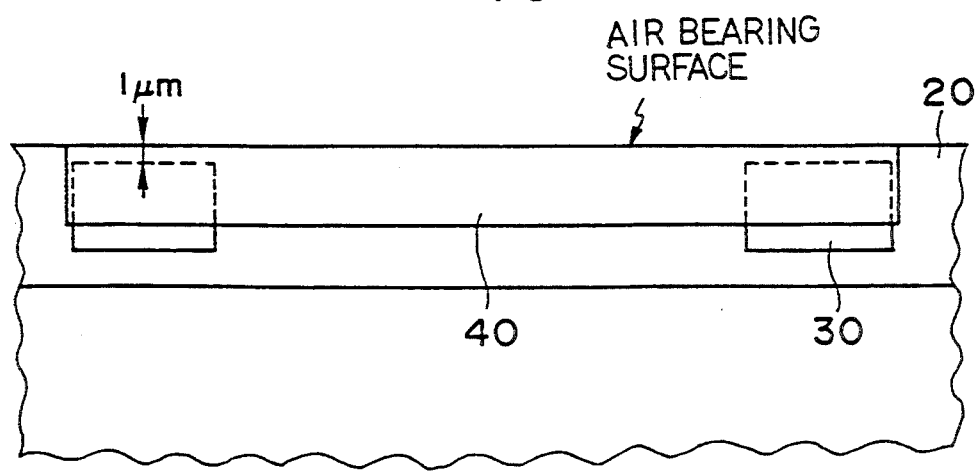

MAGNETORESISTIVE HEAD

BACKGROUND OF THE INVENTION

1. Field of the Invention

This invention relates to a magnetic recording system, and especially to a magnetoresistive head utilizing magnetoresistance effects, the head being suitable for use in a magnetic disc system, and also to a fabrication process thereof.

2. Description of the Related Art

As a magnetic head capable of reading data at high sensitivity from a magnetic surface of a magnetic recording medium, a magnetoresistive head making use of magnetoresistance effects is known. Utilizing magnetoresistance effects whereby the electrical resistance of a magnetoresistive film varies depending on the direction of magnetization of a magnetic recording medium, this magnetoresistive head converts magnetic signals on the recording medium into electric signals.

Such a magnetoresistive head is, however, accompanied by the problem that it produces noise called "Barkhausen noise" as a result of irregular shifts of domain walls, which are contained in a magnetoresistive film, by magnetic fields of signals on a recording medium.

To reduce the noise, U.S. Pat. Nos. 4,103,315, 4,809,109 and 5,014,147 disclose the provision of an antiferromagnetic layer over the whole of one side of a magnetoresistive film to produce a longitudinal bias magnetic field, which is uniform in the longitudinal direction thereof, so that domain walls in the magnetoresistive film can be eliminated utilizing magnetic exchange coupling between the antiferromagnet and the ferromagnet. The term "magnetic exchange coupling" as used herein means coupling that brings the direction of spins in an antiferromagnetic film into conformity with the direction of spins in a ferromagnetic film in the vicinity of an interface between the antiferromagnetic film and the ferromagnetic film. A layer provided to apply a longitudinal bias magnetic field in order to suppress the occurrence of magnetic walls in a magnetoresistive film will hereinafter be called a "domain wall suppressing layer".

The above-described construction wherein an antiferromagnetic film is laminated as a domain wall suppressing layer over the whole of one side of a magnetoresistive film, however, has large magnetic exchange coupling between the antiferromagnet and the ferromagnet, thereby making it difficult to rotate magnetic moments in the magnetoresistive film. As a consequence, the magnetic moments in the magnetoresistive film are difficult to rotate by magnetic fields of signals on the medium, resulting in a reduction in the sensitivity of the magnetoresistive film to the magnetic fields of signals on the medium.

With a view toward overcoming the above problem, U.S. Pat. Nos. 4,663,685 and 5,005,096 have been proposed. These patents are each concerned with a magnetoresistive transducer head. According to the inventions of these patents, domain wall suppressing layers are formed only at opposite end portions of a magnetoresistive film, respectively, to prevent Barkhausen noise without lowering the sensitivity of the magnetoresistive film to the magnetic fields of signals on a recording medium. Contemplated materials for the domain wall suppressing film include Fe-Mn alloys as antiferromagnetic materials and Co-Pt alloys as permanent magnet materials. The state of a single domain, which is maintained by the domain wall suppressing layers at the opposite end portions, also converts into a single domain a central magnetism sensing portion where no domain wall suppressing layer is disposed. Prerequisites for the conversion of the central portion into a single domain by the domain wall suppressing layer provided at the opposite end portions include a large exchange coupling field, a wide area of contact between the domain wall suppressing layers and the magnetoresistive film, and a small distance between the domain wall suppressing layers arranged at the opposite end portions of the magnetoresistive film.

The construction wherein antiferromagnetic films acting as domain wall suppressing layers are formed only at opposite end portions of a magnetoresistive film as described above can convert the whole magnetoresistive film into a single domain at laboratory level. At practical manufacturing levels, however, domain walls are formed to produce Barkhausen noise when the surface of a base substrate of a magnetoresistive head is rough, irregularities such as pinholes are present in the magnetoresistive film, pinholes are included in a film located adjacent to the magnetoresistive film and/or the magnetoresistive film is formed on a film having a stepped formation.

Further, conventional magnetoresistive heads are of the construction that an Fe-Mn alloy, an antiferromagnetic material, or a Co-Pt alloy, a permanent magnet material, of domain wall suppressing layers is exposed directly in an air bearing surface. The Fe-Mn alloy has poor corrosion resistance so that, when the Fe-Mn alloy is exposed in the air bearing surface, the characteristics of the domain wall suppressing layers are deteriorated to result in the occurrence of domain walls in the magnetoresistive film and, moreover, the magnetoresistive film and a shunt film and a soft film—both provided adjacent to the magnetoresistive film—are caused to corrode to a significant extent. As a consequence, the entire characteristics of the magnetoresistive head are deteriorated. On the other hand, the Co-Pt alloy is a ferromagnetic material and its exposure in the air bearing surface leads to the problem that a recording medium is demagnetized. To improve the corrosion resistance of a magnetic head, U.S. Pat. No. 4,825,325 discloses the formation of a capping layer over domain wall suppressing layers made of an Fe-Mn alloy and a magnetoresistive film. However, the troublesome exposure of an Fe-Mn alloy or Co-Pt alloy of domain wall suppressing layers in an air bearing surface has not been overcome.

SUMMARY OF THE INVENTION

An object of this invention is to provide a magnetoresistive head which is a practical manufacturing proposition.

In one aspect of this invention, there is thus provided a magnetoresistive head including a substrate having opposite major surfaces and a magnetoresistive film for converting a magnetic signal into an electric signal by using magnetoresistance effects. A pair of electrodes for causing a signal detection current to flow through the magnetoresistive film are provided in planes parallel with the major surface of the substrate, to comprise with the substrate surfaces a pair of first domain wall suppressing layers arranged at opposite end portions of the magnetoresistive film. These layers apply a longitudinal magnetic bias to the magnetoresistive film. Also a second domain wall suppressing layer is arranged in a position so as to apply a longitudinal magnetic bias to the magnetoresistive film, which is weaker compared with the longitudinal magnetic bias applied by the first domain wall suppressing layers.

In another aspect of this invention, there is also provided a magnetoresistive head including a substrate having opposite major surfaces, a magnetoresistive film for converting a magnetic signal into an electric signal by using magnetoresistance effects, a pair of electrodes for causing a signal detection current to flow through the magnetoresistive film, the magnetoresistive film and the paired electrodes both being provided in planes parallel with the major surfaces of the substrate, and first domain wall suppressing layers arranged at opposite end portions of the magnetoresistive film, respectively, to apply a longitudinal magnetic bias to the magnetoresistive film, the head having such a shape that a portion of the magnetoresistive film is exposed in an air bearing surface adapted to read the magnetic signal, wherein the first domain wall suppressing layers are disposed remote from the air bearing surface.

In the magnetoresistive head according to the first aspect of this invention, the first domain wall suppressing layers are arranged at the opposite end portions of the magnetoresistive film, respectively, and at the magnetism sensing portion of the magnetoresistive film. the second domain wall suppressing layer is also provided either above or below the magnetoresistive film to apply a weak longitudinal magnetic bias. Even if some pinholes or irregularity is included in the magnetoresistive film or a step is formed in the first domain wall suppressing layers, the second domain wall suppressing film formed in contact with the magnetism sensing portion of the magnetoresistive film therefore undergoes weak exchange coupling with the magnetoresistive film to prevent the occurrence of magnetic poles so that Barkhausen noise can be reduced or inhibited.

Compared with the longitudinal magnetic bias applied by the first domain wall suppressing layers, the longitudinal magnetic bias applied by the second domain wall suppressing layer is weak. An increase in the anisotropic magnetic field by the direct contact of the second domain wall suppressing layer with the magnetism sensing portion at a central section of the magnetoresistive film is at a negligible level so that the increase causes no reduction in the reproduction sensitivity of the magnetoresistive head.

In the magnetoresistive head according to the second aspect of this invention, the first domain wall suppressing layers, which are arranged at the opposite end portions of the magnetoresistive film and are adapted to apply a longitudinal magnetic bias to the opposite end portions, are disposed remote from the air bearing surface. This can significantly improve the corrosion resistance of the first domain wall suppressing layers even when a corrosive Fe-Mn alloy is used for the first domain wall suppressing layers, thereby making it possible to enhancing the reliability of the magnetoresistive head. Even when a Co-Pt alloy, a permanent magnet material, is used for the first domain wall suppressing layers, a recording medium is not demagnetized by a strong magnetic field produced by the Co-Pt alloy so that the magnetoresistive head can be provided with a high level of practical utility.

According to a magnetoresistive head incorporating both the first aspect and the second aspect of the present invention, the first domain wall suppressing layers at the opposite end portions can be arranged remote from the air bearing surface and the opposite end portions of the magnetoresistive film can also be placed remote from the air bearing surface to have a bent shape. If a magnetoresistive film is in a bent form in a conventional magnetoresistive head equipped only with first domain wall suppressing layers, a domain wall occurs from each bent point so that the magnetoresistive film cannot be maintained in a single domain. According to the present invention, however, the magnetism sensing portion at the central section of the magnetoresistive film can be maintained in the state of a single domain owing to the provision of the second domain wall suppressing layer whereby occurrence of Barkhausen noise can be prevented even when a magnetoresistive film in a bent shape is used.

The present invention can therefore prevent Barkhausen noise by a practical manufacturing process. Further, the present invention can provide a magnetoresistive head for high-density magnetic recording, which is free of the potential danger of demagnetization of recording media and which is highly reliable.

BRIEF DESCRIPTION OF THE DRAWINGS

The above and other objects, features and advantages of the present invention will become apparent from the following description and the appended claims, taken in conjunction with the accompanying drawings, in which:

FIG. 15 is a schematic fragmentary illustration of the construction of a magnetoresistive film according to a sixth embodiment of the present invention;

FIG. 16 is a schematic fragmentary illustration of the construction of a magnetoresistive film according to a seventh embodiment of the present invention.

DETAILED DESCRIPTION OF PREFERRED EMBODIMENTS

For the formation of the second domain wall suppressing layer, it is possible to use an alloy or oxide selected from the group consisting of Cr-Mn alloys, Cr-Al alloys, Cr-Ru alloys, Cr-Re alloys, Cr-Mn-Fe alloys, Cr-Mn-V alloys, Cr-Al-Fe alloys, Cr-Al-V alloys, Ni-Mn alloys, Ni-Mn-Cr alloys, nickel oxide and hematite.

The composition of the second domain wall suppressing layer is determined in such a way that the Neel temperature of the second domain wall suppressing layer becomes higher than the self-heating temperature of the magnetoresistive head during energization thereof or any temperatures encountered in the course of the fabrication process. To set the Neel temperature at 150° C. or higher, for example, it is possible to use a film of the following composition: Cr-Mn alloy (1–50 atom% Mn), Cr-Al alloy (8–30 atom% Al), Cr-Ru alloy (2–13 atom% Ru), Cr-Re alloy (2–17 atom% Re), Cr-Mn-Fe alloy (1–50 atom% Mn, 0–10 atom% Fe), Cr-Mn-V alloy (1–50 atom% Mn, 0–4 atom% V), Cr-Al-Fe alloy (8–30 atom% Al, 0–15 atom% Fe), Cr-Al-V alloy (8–30 atom% Al, 0–5 atom% V), Ni-Mn alloy (40–60 atom% Mn), Ni-Mn-Cr alloy (40–60 atom% Mn, 0–10 atom% Cr), nickel oxide (NiO, Ni:O≈1:1), or hematite ($\alpha$-$Fe_2O_3$).

Figure 17:
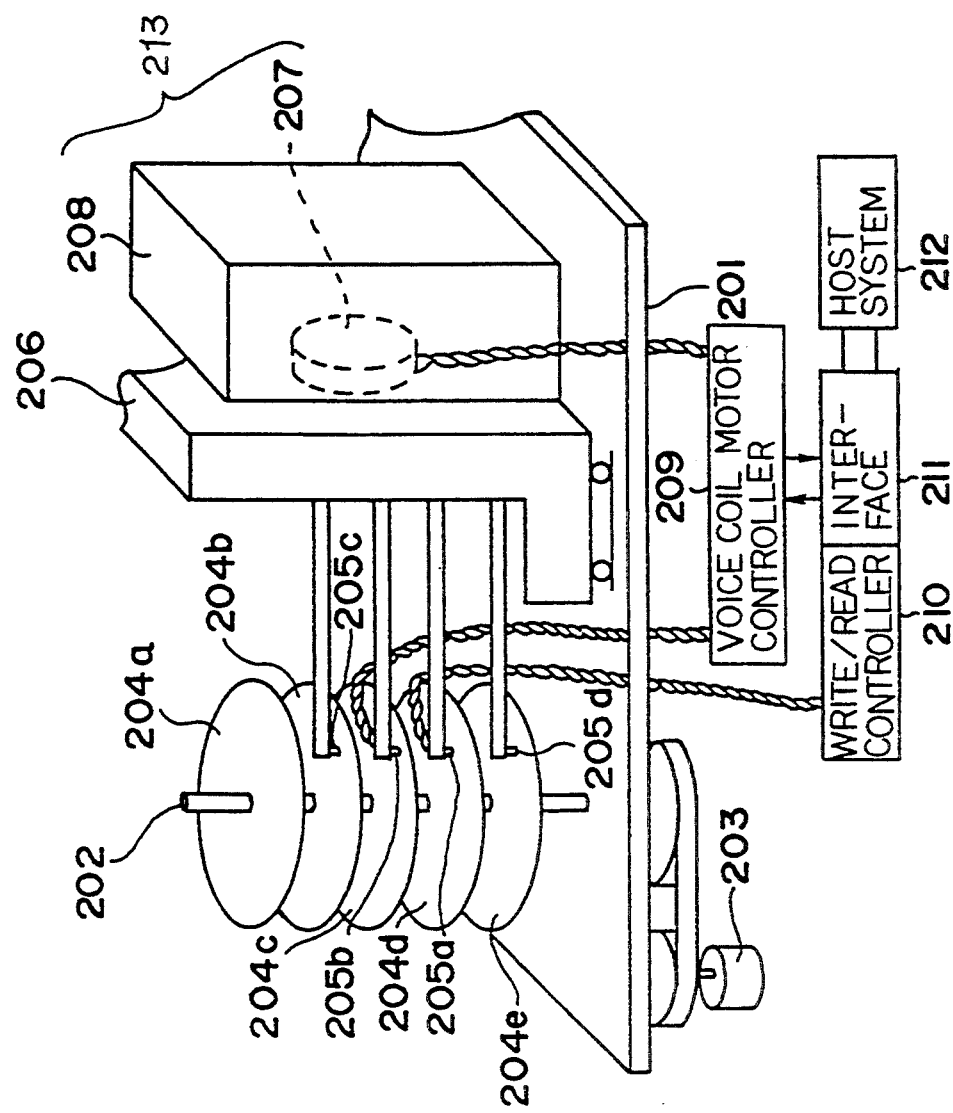
FIG. 17 is a perspective view of one example of a magnetic disc system according to the present invention.

One example of a magnetic disc system to which magnetoresistive heads according to this invention have been applied will be described with reference to FIG. 17. FIG. 17 is a perspective view showing the outline structure of the magnetic disc system.

The outline structure of the magnetic disc system will now be described. As is illustrated in the drawing, the magnetic disc system is provided with a spindle 202, a plurality of magnetic discs 204a, 204b, 204c, 204d, 204e located at equal intervals along the spindle 202, which is an axis, and a motor 203 for driving the spindle 202. Also provided are a movable carriage 206, a group of magnetic heads 205a, 205b, 205c, 205d held on the carriage 206, a magnet 208 and a voice coil 207 acting in combination with a voice coil motor 213 for driving the carriage 206, as well as a base 201 supporting the aforementioned elements thereon. The magnetic disc system is also equipped with a voice coil motor controller 209 for controlling the voice coil motor 213 in accordance with a signal outputted from a host system 212 such as a magnetic disc controller. Provided further is a write/read controller 210 having the function to convert, in accordance with a writing system for the magnetic disc 204a or the like, each piece of data fed from the host system 212 into a current to be fed to the magnetic head and also the function to amplify each piece of data fed from the magnetic disc 204a or the like and then to convert it into a digital signal. The write/read controller 210 is connected to the host system 212 via an interface 211.

A description will next be made of operations upon reading data of the magnetic disc 204d in the magnetic disc system. A command designating the data to be read is sent from the host system 212 to the voice coil motor controller 209 via the interface 211. The voice coil motor 213 drives the carriage 206 in accordance with a control current from the voice coil motor controller 209, whereby the grouped magnetic heads 205a, 205b, 205c, 205d are moved at a high speed to the positions corresponding to the track where the designated data are stored on the magnetic disc 204d and are positioned there accurately. This positioning is performed in the following manner. The positioning magnetic head 205b connected to the voice coil motor controller 209 detects a position on the magnetic disc 204c and provides the thus-detected position, and positional control of the data-carrying magnetic head 205a is then effected. The motor 203 supported on the base 201 rotates the plural magnetic discs 204a, 204b, 204c, 204d, 204e having a diameter of 3.5 inches and being mounted on the spindle 202. The designated, prescribed magnetic head 204a is next selected in accordance with a signal from the write/read controller 210. After the leading position of a designated region has been detected, data signals on the magnetic disc 205d are read. This reading is effected by the feeding and reception of signals between the data-reading magnetic head 205a connected to the write/read controller 210 and the magnetic disc 204d. The data so read are converted to predetermined signals and are then outputted to the host system 212.

Figure 1:
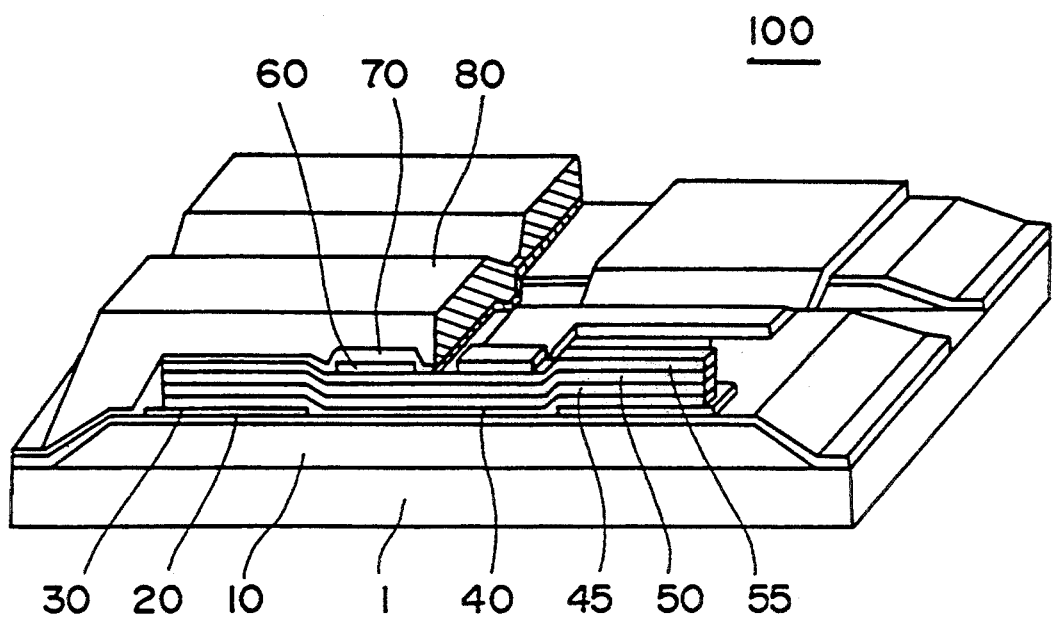
FIG. 1 is a perspective view of a magnetoresistive head according to a first embodiment of this invention, in which parts of a magnetic shield layer 80 and an upper gap film 70 have been cut away.
Figure 2:
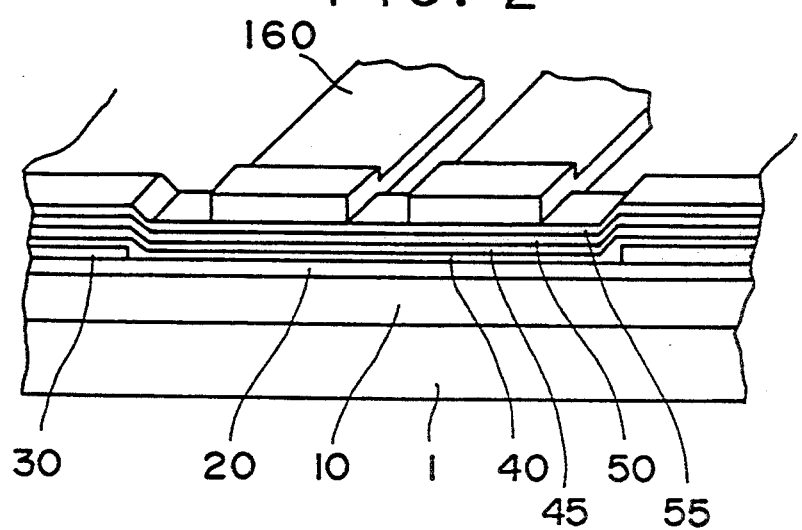
FIG. 2 is a fragmentary perspective view of the magnetoresistive head shown in FIG. 1.
Figure 3:
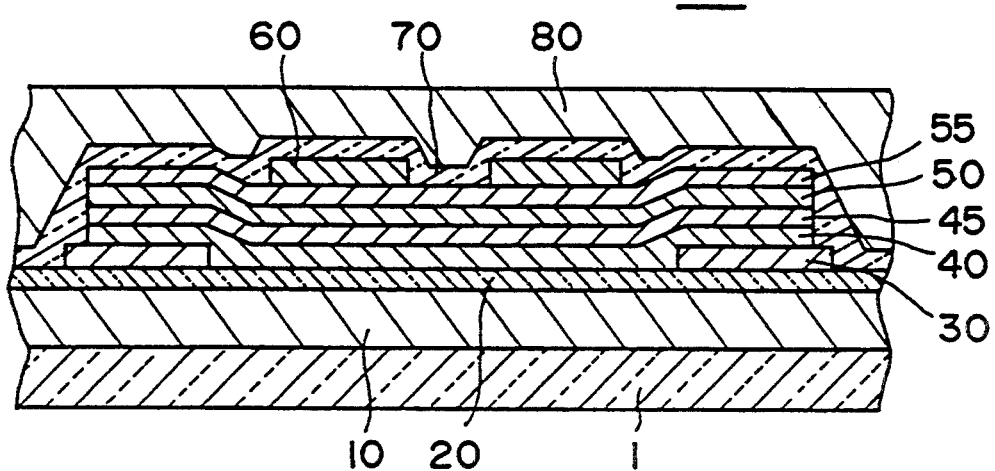
FIG. 3 is a fragmentary cross-sectional view of the magnetoresistive head depicted in FIG. 1.

As the first embodiment of the present invention, the magnetoresistive head which is designated at numeral 100 and is usable in the magnetic disc system of FIG. 17 will now be described with reference to FIGS. 1, 2 and 3. As is understood from these drawings, the magnetoresistive head 100 is provided with a substrate 1 having opposite major surfaces, a lower magnetic shield layer 10 formed on the substrate, and a lower gap film 20 formed on the lower magnetic shield layer 10. A pair of first domain wall suppressing layers 30 are formed on opposite end portions of the lower gap film 20, respectively. In contact with the first domain wall suppressing layers 30 and the lower gap film 20, a magnetoresistive film 40 is formed. On the magnetoresistive film 40, a second domain wall suppressing layer 45, a shunt film 50 and a soft adjacent film 55 are formed successively one over another. At a predetermined location on the soft adjacent film 55, signal read electrodes 60 are formed at a desired interval. An upper gap film 70 and an upper magnetic shield layer 80 are formed further successively one over the other on the signal read electrodes 60.

The function and material of each of the layers and films will next be described. The lower magnetic shield layer 10 and the upper magnetic shield layer 80 protect the magnetoresistive film 40 from any influence of magnetic fields other than magnetic fields of signals on a recording medium and, hence, function to improve the signal resolution of the magnetoresistive head. They are made of a soft magnetic material such as an Ni-Fe alloy or a Co-base amorphous alloy and have a film thickness of about 0.5–3 μm.

The lower gap film 20 and the upper gap film 70 function to electrically and magnetically isolate the magnetoresistive element, which is formed of the individual layers between the lower gap film 20 and the upper gap film 70, from the lower magnetic shield layer 10 and the upper magnetic shield layer 80 and vice versa. They are formed of a non-magnetic, insulating material such as glass or alumina. As the thicknesses of the lower gap film 20 and the upper gap film 70 affect the reproduction resolution of the magnetoresistive head, they are dependent on the recording density desired for the magnetic head and are generally in a range of 0.4–0.1 $\mu$m.

The magnetoresistive film 40 has magnetoresistance effects whereby its electrical resistance varies with the direction of magnetization of a recording medium, and it thus converts each magnetic signal into an electrical signal. The magnetoresistive film 40 is formed of a thin film of a ferromagnetic material such as an Ni-Fe alloy, Ni-Co alloy or Ni-Fe-Co alloy. Its thickness ranges from about 0.01 $\mu$m to about 0.045 $\mu$m.

The paired signal read electrodes 60 are used to cause a sufficient current (for example, about $1 \times 10^6$ to $2 \times 10^7$ A/cm$^2$) to flow through the magnetoresistive film 40 so as to detect the electrical resistance of the magnetoresistive film 40. As the signal read electrodes 60, thin films of a material having low electrical resistance, such as copper or gold, are generally used.

The shunt film 50 and the soft adjacent film 55 serve to apply a transverse magnetic bias to the magnetoresistive film 40 to make the latter highly sensitive. The shunt film 50 applies a transverse bias field, which has been developed by a current flowing through the shunt film 50, to the magnetoresistive film 40. A metal such as Ti, Nb, Ta, Mo or W is used as its material, and its thickness may range from 0.01 $\mu$m to 0.04 $\mu$m. The resistivity of the shunt film 50 is about 1–4 times the resistivity of the magnetoresistive film 40. The shunt film 50 is designed by suitably adjusting not only its thickness but also its resistivity. The soft adjacent film 55 serves to efficiently apply to the magnetoresistive film 40 a magnetic field which has been developed by a current flowing through the magnetoresistive film 40. As a material for the soft adjacent film 55, a crystalline ferromagnetic material having high resistivity and soft magnetic characteristics or a ferromagnetic material such as a Co-base amorphous alloy is used. The soft adjacent film 55 is formed over the magnetoresistive film 40 with a non-magnetic layer (the shunt film 50 in this embodiment) interposed therebetween.

Figure 8:
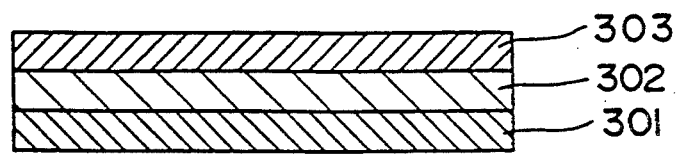
FIG. 8 is a cross-sectional view showing the construction of a first domain wall suppressing layer 30 in the present invention.

The first domain wall suppressing layers 30 are formed on the opposite end portions of the magnetoresistive film 40. By applying a strong longitudinal magnetic bias to the opposite end portions, the first domain wall suppressing layers 30 serve to maintain the opposite end portions of the magnetoresistive film 40 in the state of a single domain. The application of the strong longitudinal magnetic bias to the opposite end portions also forcedly brings the central section, where the first domain wall suppressing layers 30 are not formed, into the state of the single domain. The first domain wall suppressing layers are provided only on the end portions of the magnetoresistive film 40, because this arrangement fixes the magnetic moment of the central section and, hence, prevents any appreciable reduction in the sensitivity of the magnetoresistive film 40. FIG. 8 is a cross-sectional view of each first domain wall suppressing layer 30. As is clearly envisaged from FIG. 8, the first domain wall suppressing layer 30 is in the form of a three-layer film which is composed of a ferromagnetic film 301, an antiferromagnetic film 302 and a ferromagnetic film 303. In the vicinity of the interface between the ferromagnetic film 303 and the antiferromagnetic film 302, magnetic exchange coupling takes place such that the direction of spins in the ferromagnetic film 303 is brought into conformity with the direction of spins in the antiferromagnetic film 302, whereby the ferromagnetic film 303 is brought into the state of a single domain. The ferromagnetic film 303 in the state of the single domain renders the corresponding end portion of the magnetoresistive film 40, which is lying on the ferromagnetic film 303, into the state of a single domain owing to the strong exchange coupling between the ferromagnet and the ferromagnet.

It is also possible to bring the magnetoresistive film 40 into the state of a single domain through magnetic exchange coupling by adopting the structure that the antiferromagnetic film 302 directly contacts the ferromagnetic film 40 without forming the ferromagnetic film 303. Coupling is, however, not feasible unless the interface is clean, because the exchange coupling between an antiferromagnet and a ferromagnet is weak. Accordingly, care must be exercised to the control of a process upon fabrication. The interposition of the ferromagnetic film 303 can enhance the exchange coupling between the first domain wall suppressing layer 30 and the magnetoresistive film 40 owing to the strong exchange coupling between the ferromagnet and the ferromagnet even if the surface of the first domain wall suppressing layer 30 is somewhat contaminated upon patterning the first domain wall suppression layer 30 in the fabrication process. The antiferromagnetic film 302 is formed of a thin Fe-Mn alloy film and its thickness is generally 0.01–0.05 $\mu$m. The ferromagnetic films 301,302 are formed of an Ni-Fe alloy and their thicknesses generally ranges from 0.01 $\mu$m to 0.05 $\mu$m.

The second domain wall suppressing layer 45 is formed in contact with the magnetoresistive film 40 and is arranged in the same shape as the magnetoresistive film 40. The second domain wall suppressing layer 45 is formed of an antiferromagnetic film which undergoes weak magnetic exchange coupling with the magnetoresistive film 40 and serves to directly apply a weak longitudinal bias field not only to the end portions of the magnetoresistive film 40 but also to the magnetism sensing portion. At the interface between the magnetoresistive film 40 and the second domain wall suppressing layer 45, weak magnetic exchange coupling takes place so that the state of a single domain of the magnetoresistive film is maintained. As an antiferromagnetic material for forming the second domain wall suppressing layer 45, it is possible to use any one of the following alloys: Cr-Mn alloys (1–50 atom% Mn), Cr-Al alloys (8–30 atom% Al), Cr-Ru alloys (2–13 atom% Ru), Cr-Re alloys (2–17 atom% Re), Cr-Mn-Fe alloys (1–50 atom% Mn, 0–10 atom% Fe), Cr-Mn-V alloys (1–50 atom% Mn, 0–4 atom% V), Cr-Al-Fe alloys (8–30 atom% Al, 0–14 atom% Fe), Cr-Al-V alloys (8–30 atom% Al, 0–5 atom% V), Ni-Mn alloys (40–60 atom% Mn), and Ni-Mn-Cr alloys (40–60 atom% Mn, 0–10 atom% Cr). Its thickness generally ranges from 0.01 $\mu$m to 0.05 $\mu$m. As the second domain wall suppressing layer 45 is interposed between the magnetoresistive film 40 and the shunt film 50, an antiferromagnetic material such as a semiconductor or insulator, for example, nickel oxide or hematite is not used. If these materials should be used, the magnetoresistive film 40 is electrically insulated so that a sufficient current is not allowed to flow through the magnetoresistive film.

A conventional magnetoresistive head having only the first domain wall suppressing layers 30 on the respective lower opposite end portions of the magnetoresistive film 40, respectively, can be converted into the state of a single domain and maintained in the same state and can prevent Barkhausen noise at laboratory level of provided that the distance between the paired first domain wall suppressing layers 40 is small. Barkhausen noise is, however, observed on a conventional head with the first domain wall suppressing layers 30 arranged on the respective upper opposite end portions of the magnetoresistive film 40 even at the laboratory level. As a consequence, the structure with the first domain wall suppressing layers 30 formed on the respective lower opposite end portions is superior for the prevention of noise to the structure with the first domain wall suppressing layers 40 formed on the respective upper opposite end portions. Probably, the coupling between the magnetoresistive film 40 and the first domain wall suppressing layers 30 is not based solely on the strong magnetic coupling between the ferromagnetic film and the antiferromagnetic films but, in each first domain wall suppressing layer 30 formed of the above-described three-layer film composed of the ferromagnetic film 303, the antiferromagnetic film 302 and the ferromagnetic film 301, the ferromagnetic films 303, 301 as the uppermost and lowermost layers behave similarly to a permanent magnet and apply a strong magnetic flux in the longitudinal direction to the opposite end portions located thereunderneath. Even in the structure with the first domain wall suppressing layer formed on the respective lower opposite end portions, the inclusion of roughness or an impurity in the magnetoresistive film 40, the existence of a step in the magnetoresistive film 40 or the inclusion of a vacancy in the magnetoresistive film 40 due to an unduly small thickness thereof leads to the development of magnetic poles, and hence, a domain wall centering around the roughness, impurity, step or vacancy so that Barkhausen noise is produced. This conventional head therefore has poor mass producibility.

According to the present invention, the first domain wall suppressing layers 30 are provided on the opposite end portions of the magnetoresistive film 40, respectively, and the second domain wall suppressing layer 45 which undergoes weak magnetic exchange coupling with the magnetoresistive film 40 is formed over the entire surface of the magnetoresistive film 40, whereby the magnetoresistive film 40 can be completely brought into a single domain. Compared with the longitudinal bias fields formed by the first domain wall suppressing layers 30 made of the above-mentioned Fe-Mn alloy, the longitudinal bias field formed by the second domain wall suppressing layer 45 making use of the above-described antiferromagnetic materials such as a Cr-Mn alloy is very weak so that the formation of the second domain wall suppressing layer 35 over the entire surface of the magnetoresistive film 40 does not cause any appreciable reduction in the detection sensitivity of the magnetoresistive film 40. Accordingly, the magnetoresistive head 100 according to the present invention can prevent the occurrence of magnetic poles in the magnetoresistive film 40 even if some roughness, impurity and/or vacancy is included in the magnetoresistive film 40. The magnetoresistive head 100 of this invention, therefore, has high detection sensitivity, does not produce Barkhausen noise, is highly reliable and is excellent for mass production.

A description will next be made of a process for the fabrication of the magnetoresistive head 100 of this embodiment. Incidentally, the thin-film forming process and patterning process, which will be described below, use known sputtering and photolithographic techniques.

On the substrate 1 made of zirconia, an Ni-Fe alloy as the lower shield layer 10 is first formed to a thickness of 2 $\mu$m. Alumina as the lower gap film 20 is then formed to a thickness of 0.3 $\mu$m over the lower shield layer 10. The lower shield layer 10 and the lower gap film 20 are then worked into prescribed shapes, respectively. Here, opposite end portions of the lower magnetic shield layer 10 are worked such that they are inclined relative to the plane of the substrate as illustrated in FIG. 1. This is to avoid any accidental cut-off of leads for the signal read electrodes 60, the leads being formed to cover the lower magnetic shield layer, at the opposite end portions of the lower magnetic shield layer 10.

The first domain wall suppressing layers 30 are then formed in a pair on the lower gap film 20. To align the direction of each magnetic moment in the magnetoresistive film 40 in the longitudinal direction by the first domain wall suppressing layers 30, the direction of each magnetic spin in the ferromagnetic film 303 of each domain wall suppressing layer 30 must be aligned in the longitudinal direction. The first domain wall suppressing layer 30 having such anisotropy can be formed by a process to be described next.

As is illustrated in FIG. 8, each domain wall suppressing layer 30 is formed of the three-layer film which is in turn composed of the ferromagnetic film 301 as the lowermost layer, the antiferromagnetic film 302 as an intermediate layer and the ferromagnetic layer 303 as the uppermost layer. These three films are formed successively in the same vacuum vessel while applying an external magnetic field in a single direction. The ferromagnetic film 301 as the lowermost layer is formed first. Since the ferromagnetic film 301 is formed under the conditions that the magnetic field is applied in the single direction, magnetic moments in the ferromagnetic film 301 are directed in the same direction as the magnetic field applied from the outside. This is called "magnetic anisotropy".

The antiferromagnetic film 302 is formed on the ferromagnetic film 301. Different from a ferromagnetic material, an antiferromagnetic material is hardly magnetized by an external magnetic field. Mere application of an external magnetic field is, therefore, not sufficient to control the direction of magnetic spins in an antiferromagnetic material. Underneath the antiferromagnetic film 302, there is however formed the ferromagnetic film 301 in which the direction of magnetic moments have been aligned in a certain specific direction. Many spins in the antiferromagnetic film 302 at the interface between the antiferromagnetic film 302 and the ferromagnetic film 301 are therefore directed in the direction of the magnetic spins in the ferromagnetic film 301 at the interface. This is because the ferromagnetic material applies an internal magnetic field to the antiferromagnetic film at the interface. Once magnetic anisotropy is imparted to the antiferromagnetic film, the magnetic spins in the antiferromagnetic film 302 at the ferromagnet-antiferromagnet interface then tend to make magnetic spins of the ferromagnetic film 301 align in the direction of the magnetic spins of the antiferromagnetic film at the interface. As a consequence, the magnetic spins in the ferromagnetic film 301 are aligned in the specific direction.

Further, the ferromagnetic film 303 is formed on the antiferromagnetic film 302. Here again, the direction of magnetic spin in the ferromagnetic film 303 is aligned in the direction of many magnetic spins in the antiferromagnetic film 302 at the interface between the ferromagnetic film 303 and the antiferromagnetic film 302. The antiferromagnetic film 302 is usually polycrystalline so that not all magnetic spins are aligned in the same direction in the film. To effectively align the directions of the magnetic spins in the antiferromagnetic material at the ferromagnet-antiferromagnet interface, the three-layer film is formed at a temperature higher than the Neel temperature of the antiferromagnetic material which makes up the antiferromagnetic film 302. Accordingly, the magnetic spins in the ferromagnetic film 301 and those in the ferromagnetic film 303 are effectively aligned in a particular single direction so that strong magnetic anisotropy is applied in the direction of the ferromagnetic film 301 and the ferromagnetic film 303.

The ferromagnetic film 301, the antiferromagnetic film 302 and the ferromagnetic film 303 should be formed successively in the same vacuum vessel, because magnetic exchange coupling between an antiferromagnetic film and a ferromagnetic film takes place only in the vicinity of the interface therebetween and the deposition of any impurity on the ferromagnetic film and/or the antiferromagnetic film or the formation of any oxide on the ferromagnetic film and/or the antiferromagnetic film weakens the magnetic exchange coupling extremely.

The ferromagnetic film 301 also functions as a base layer upon formation of the antiferromagnetic film 302 with the Fe-Mn alloy. As is known well, in an Fe-Mn alloy, it is only the $\gamma$-phase of the f.c.c. crystal structure that has a Neel temperature higher than room temperature. This $\gamma$-phase however remains stable only at a high temperature so that it cannot be formed as a stable layer if a conventional process such as sputtering is used. In the domain wall suppressing layer 30, the ferromagnetic film 301 has the f.c.c. crystal structure. When an Fe-Mn alloy layer is formed on ferromagnetic film 301 of the f.c.c. crystal structure, the Fe-Mn alloy layer as the antiferromagnetic film 302 hence grows epitaxially so that a $\gamma$-phase of the f.c.c. crystal structure is stably formed. In an upper part of the Fe-Mn alloy layer, however, the crystal structure transforms from the $\gamma$-phase to the $\alpha$-phase whose room temperature is lower than Neel temperature. In the domain wall suppressing layer 30, the minimum thickness of the Fe-Mn alloy layer in which the transformation takes place is about 1,000 Å. At a film thickness greater than about 1,000 Å, the antiferromagnetic film 302 formed of the Fe-Mn alloy layer is transformed into the $\alpha$-phase so that antiferromagnet-ferromagnet coupling does not occur in many instances between the antiferromagnetic film 302 and the ferromagnetic film 303. This makes it impossible to form a domain wall suppressing layer. It is therefore desirous to control the thickness of the antiferromagnetic layer 302 to be within about 1,000 Å.

The three-layer film formed as described above is then subjected to patterning such that only portions of the three-layer film which correspond to the opposite end portions of the magnetoresistive film 40 are allowed to remain, whereby the first domain wall suppressing layers 30 are formed. In this patterning step, the surface of the ferromagnetic film 303 is exposed to the external atmosphere. The magnetic exchange coupling between the ferromagnetic film 303 and the magnetoresistive film 40, which is formed on the ferromagnetic film 303, is not weakened even if some impurities deposit there, because the ferromagnet-ferromagnet coupling between the ferromagnetic film 303 and the magnetoresistive film 40 is very strong.

On the first domain wall suppressing layers 30 and the lower gap film 20 located between the first domain wall suppressing layers 30, an Ni-Fe alloy film as the magnetoresistive film 40 is then formed to a thickness of 400 Å, followed by the formation of an antiferromagnetic film which forms the second domain wall suppressing layer 45. Since the magnetic coupling between the magnetoresistive film 40 and the second domain wall suppressing layer 45 is ferrogmagnet-antiferromagnet coupling, these layers are formed successively in the same vacuum vessel in order to keep their interfaces clean. Strong magnetic anisotropy has already been applied in the longitudinal direction to the magnetoresistive film 40 by the first domain wall suppressing layers 30 formed beforehand, so the directions of magnetic spins are aligned. At the interface between the magnetoresistive film 40 and the second domain wall suppressing layer 45, many magnetic spins in the antiferromagnetic film as the second domain wall suppressing layer 45 are thus aligned in the longitudinal direction. As a result, magnetic anisotropy has now been imparted to the magnetoresistive film 40.

Next, an Nb film as the shunt film 50 is formed to a thickness of 400 Å, followed by the formation of a soft adjacent film as the soft adjacent film 55 to the thickness of 400 Å on the shunt film 50. After two-layer films made of gold and titanium are then formed as signal read electrodes 60 to a thickness of 0.1 $\mu$m, the two-layer films are worked. Over the signal read electrodes 60, alumina as the upper gap film 70 is formed further to a thickness of 0.3 $\mu$m. An Ni-Fe alloy film as the upper magnetic shield layer 80 is then formed to a thickness of 2 $\mu$m, followed by the formation of a protective film with alumina so that the fabrication of the magnetoresistive head 100 has been completed.

Figure 4:
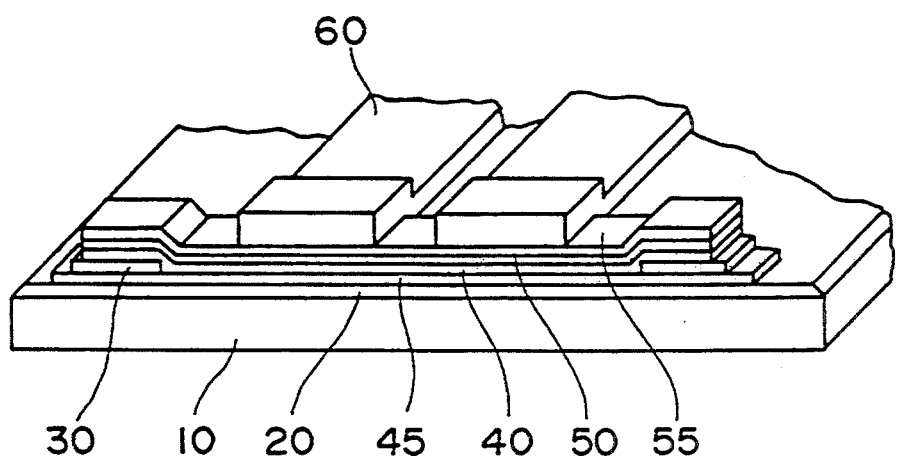
FIG. 4 is a fragmentary perspective view of a magnetoresistive head according to a second embodiment of the present invention.
Figure 5:
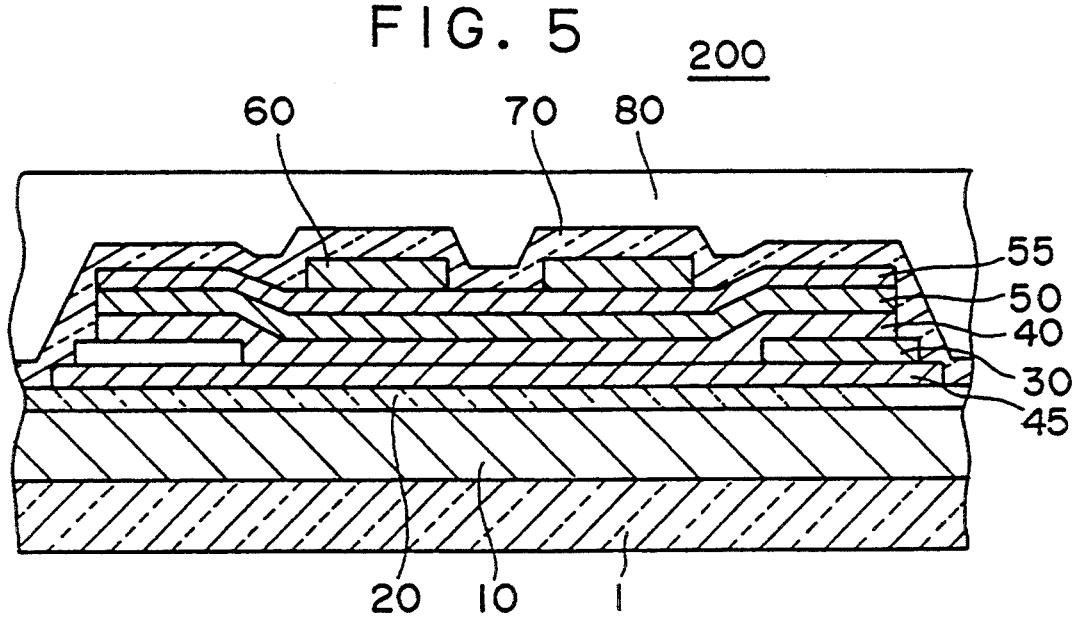
FIG. 5 is a fragmentary cross-sectional view of the magnetoresistive head illustrated in FIG. 4.

With reference to FIGS. 4 and 5, the magnetoresistive head according to the second embodiment of this invention, which is designated at numeral 200, will be described next. As is understood from FIGS. 4 and 5, the magnetoresistive head 200 is provided with a substrate 1, a lower shield layer 10 formed on the substrate, a lower gap film 20 formed on the lower shield layer 10, and a second domain wall suppressing film 45 formed on the lower gap film 20. On opposite end portions of the second domain wall suppressing layer 45, a pair of first domain wall suppressing layers 30 are formed, respectively. In contact with the first domain wall suppressing layers 30 and the second domain wall suppressing layer 45, a magnetoresistive film 40 is formed. Formed respectively on the magnetoresistive film 40 are a shunt film 50 and a soft adjacent film 55. Signal read electrodes 60 are formed at a predetermined interval on the soft adjacent film 55 at prescribed locations, respectively. An upper gap film 70 and an upper magnetic shield film 80 are formed further over the signal read electrodes 60.

As an antiferromagnetic material usable for the formation of the second domain wall suppressing layer 45 in the magnetoresistive head 200 according to the second embodiment, it is possible to use any one of the following alloys and oxides: Cr-Mn alloys (1–50 atom% Mn), Cr-Al alloys (8–30 atom% Al), Cr-Ru alloys (2–13 atom% Ru), Cr-Re alloys (2–17 atom% Re), Cr-Mn-Fe alloys (1–50 atom% Mn, 0–10 atom% Fe), Cr-Mn-V alloys (1–50 atom% Mn, 0–4 atom% V), Cr-Al-Fe alloys (8–30 atom% Al, 0–14 atom% Fe), Cr-Al-V alloys (8–30 atom% Al, 0–5 atom% V), Ni-Mn alloys (40–60 atom% Mn), Ni-Mn-Cr alloys (40–60 atom% Mn, 0–10 atom% Cr), nickel oxide (NiO, Ni:O≈1:1), and hematite ($\alpha$-$Fe_2O_3$). Different from the magnetoresistive head 100 according to the first embodiment, the second domain wall suppressing layer 45 is not located between the magnetoresistive film 40 and the shunt film 50. It is therefore possible to use an antiferromagnetic material such as a semiconductor or insulator, for example, nickel oxide or hematite. Description of the functions and materials of the other layers and films is omitted herein as they are similar to the corresponding layers and films in the magnetoresistive head 100 according to the first embodiment.

In the magnetoresistive head 200, the second domain wall suppressing layer 45 is formed on an upper side of the lower gap film 20 as illustrated in FIGS. 4 and 5. The first domain wall suppressing layers 30 apply a strong longitudinal bias field to the magnetoresistive film 40 and, further, the second domain wall suppressing film 45 forms weak magnetic exchange coupling with the magnetoresistive film 40. A magnetism-sensing portion of the magnetoresistive film 40, therefore, is in contact with the second domain wall suppressing film and is applied with a longitudinal bias field. Similarly to the magnetoresistive head 100 according to the first embodiment, even if the magnetoresistive film 40 in the magnetoresistive head 200 contains some roughness, impurities, vacancy or steps, the occurrence of magnetic poles can therefore be prevented and the occurrence of Barkhausen noise due to the occurrence of domain walls can be prevented. The longitudinal bias field formed by the second domain wall suppressing layer 45 is very weak compared with the longitudinal bias filed formed by the first domain wall suppressing layers 30, whereby the detection sensitivity of the magnetoresistive film 45 is not lowered.

A description will next be made of a process for the fabrication of the magnetoresistive head 200 according to the present invention. On the substrate 1, the lower shield layer 10 and the lower gap film 20 are formed successively. The formation techniques, thicknesses and working of these layer and film are as in the first embodiment so that their description is omitted herein. The second domain wall suppressing layer 45 is formed on the lower gap film 20. The first domain wall suppressing layer 30 is then formed on the second domain wall suppressing layer 45 as in the first embodiment, namely, the ferromagnetic film 301, the antiferromagnetic film 302 and the ferromagnetic film 303 are successively formed while externally applying a magnetic field in one direction. The resulting three-layer film is then subjected to patterning such that only portions corresponding to opposite end portions of the second domain wall suppressing layer 45 are allowed to remain, whereby the first domain wall suppressing layers 30 are formed. The surface of the second domain wall suppressing layer 45 and the surfaces of the ferromagnetic films 303 of the first domain wall suppressing layers 30 are subjected to sputter cleaning and, in succession to the sputter cleaning, an Ni-Fe alloy film as the magnetoresistive film 40 is formed to a thickness of 400 Å. This is to remove any impurities or oxides which may have been deposited or formed on the surfaces of the ferromagnetic films 303 and second magnetoresistive film 45 during the patterning, thereby avoiding any prevention to the ferromagnet-antiferromagnet magnetic exchange coupling between the second domain wall suppressing layer 45 and the magnetoresistive film 40.

The second domain wall suppressing layer 45 is of such a construction that it does not have any ferromagnetic film as a lower layer. At the stage where the second domain wall suppressing layer 45 has been formed, magnetic moments in the antiferromagnet of the second domain wall suppressing layer 45 have not aligned in any particular direction. Upon the formation of the magnetoresistive film 40 by sputtering, the temperature of the outermost surface of the second domain wall suppressing layer 45 is controlled at a level at least equal to the Neel temperature of the antiferromagnetic material making up the second domain wall suppressing layer 45. As a consequence, the spins in the outermost surface of the antiferromagnetic film are directed in the longitudinal direction so that weak magnetic exchange coupling occurs at the interface between the magnetoresistive film 40 and the second domain wall suppressing layer 45. With regard to the magnetic exchange coupling between the first domain wall suppressing layers 30 and the magnetoresistive film 40, on the other hand, the magnetic spins in the magnetoresistive film 40 are aligned in the longitudinal direction by the ferromagnetic films 303 as described above in connection with the magnetoresistive head 100.

Further, the shunt film 50, the soft adjacent film 55, the signal read electrodes 60, the upper gap film 70 and the upper magnetic shield layer 80 are successively formed on the magnetoresistive film 40, whereby the fabrication of the magnetoresistive head 200 has been completed. The materials, forming techniques, working methods and film or layer thicknesses are as in the first embodiment, so that their description is omitted herein.

Figure 6:
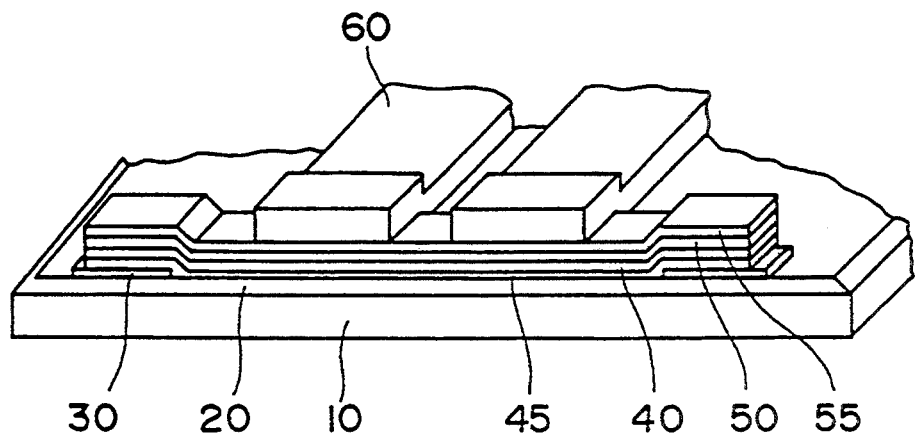
FIG. 6 is a fragmentary perspective view of a magnetoresistive head according to a third embodiment of the present invention.
Figure 7:
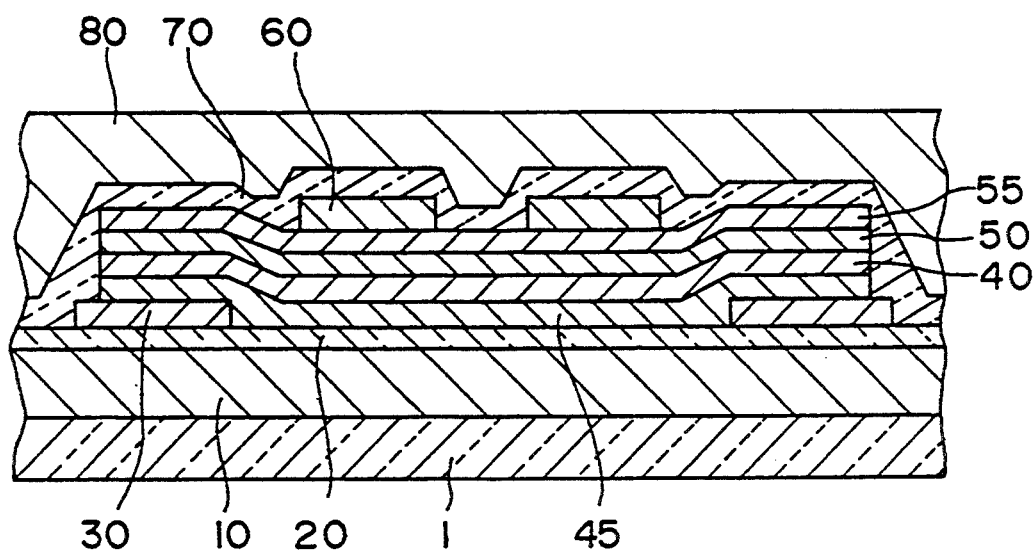
FIG. 7 is a fragmentary cross-sectional view of the magnetoresistive head illustrated in FIG. 6.

Referring next to FIGS. 6 and 7, the structure of the magnetoresistive head according to the third embodiment of this invention, which is designated at numeral 300, will be described. As is depicted in FIGS. 6 and 7, the magnetoresistive head 300 is provided with a substrate 1, a lower magnetic shield layer 10 formed on the substrate 1, and a lower gap film 20 formed on the lower magnetic shield layer 10. A pair of first domain wall suppressing layers 30 are formed on opposite end portions of the lower gap film 20, respectively. In contact with the first domain wall suppressing layers 30 and also with the lower gap film 20 located between the first domain wall suppressing layers 30, a second domain wall suppressing layer 45 is formed. Formed successively on the second domain wall suppressing layer 45 are a magnetoresistive film 40, a shunt film 50 and a soft adjacent film 55. Signal read electrodes 60 are formed at a desired interval on the soft adjacent film at prescribed locations, respectively, and an upper gap film 70 and an upper magnetic shield layer 80 are formed further over the signal read electrodes 60.

As the magnetoresistive head 300 has the structure such that the first domain wall suppressing layer 30 and the magnetoresistive film 40 are isolated from each other with the second domain wall suppressing layer 45 interposed therebetween, no magnetic exchange coupling takes place between the magnetoresistive film 40 and the first domain wall suppressing layers 30. In this construction, the first domain wall suppressing layers 30 function similarly to permanent magnets and apply a strong magnetic flux in the longitudinal direction to the magnetoresistive film 40, so that a strong longitudinal bias field is applied to the magnetoresistive film 40. The material of the first domain wall suppressing layers 30 is the same as in the first embodiment. The functions and materials of the respective films or layers other than the first domain wall suppressing layers 30 are as in the magnetoresistive head 200 according to the second embodiment so that their description is omitted herein.

In the magnetoresistive head 300, the second domain wall suppressing layer 45 is formed coveting the lower gap film 20 and also the first domain wall suppressing layers 30 arranged on the opposite upper end portions of the lower gap film 20. In the vicinity of the interface between the second domain wall suppressing layer 45 and the magnetoresistive film 40, a central section of the magnetoresistive film 40, which is a signal detecting portion, is maintained in the state of a single domain by weak magnetic exchange coupling. The first domain wall suppressing layers 30 apply a strong longitudinal bias field to the opposite end portions of the magnetoresistive film 40 as described above. In the magnetoresistive head 300, the magnetoresistive film 40 is, therefore, controlled in the state of a single domain by the first domain wall suppressing layers 30. Further, a longitudinal bias field is applied to the magnetism sensing portion of the magnetoresistive film 40 by the second domain wall suppressing layer 45. Even if some roughness, impurities, vacancy or steps are included, the occurrence of magnetic poles can hence be avoided, thereby making it possible to inhibit the occurrence of Barkhausen noise due to the occurrence of domain walls. The longitudinal bias field formed by the second domain wall suppressing layer 45 does not cause any reduction in the detection sensitivity of the magnetoresistive film 45 because it is very weak compared with the longitudinal bias field formed by the first domain wall suppressing layers 30.

A description will next be made of a process for the fabrication of the magnetoresistive head 300. First, the lower shield layer 10 and the lower gap film 20 are formed successively on the substrate 1. Their materials, film or layer thicknesses, forming techniques and working methods are as in the first embodiment, so that their description is omitted herein. The first domain wall suppressing layer 30 is then formed on the lower gap film 20 as in the first embodiment, namely, the ferromagnetic film 301, the antiferromagnetic film 302 and the ferromagnetic film 303 are successively formed while externally applying a magnetic field in one direction. The resulting three-layer film is then subjected to patterning such that the first domain wall suppressing layers are formed only on opposite end portions of the lower gap film 20. The surfaces of the first domain wall suppressing layers 40 and the surface of the lower gap film 20 are subjected to sputter cleaning and, in succession to the sputter cleaning, the second domain wall suppressing layer 45 and an Ni-Fe alloy film as the magnetoresistive film 40 are formed to a thickness to 400 Å each. Similarly to the magnetoresistive head 200, upon the formation of the magnetoresistive film 40 by sputtering, the temperature of the outermost surface of the second domain wall suppressing film 45 is raised to at least the Neel temperature of the antiferromagnetic substance making up the second domain wall suppressing layer 45. As a consequence, the spins in the outermost surface of the antiferromagnetic film are directed in the longitudinal direction so that weak magnetic exchange coupling takes place at the interface between the magnetoresistive film 40 and the second domain wall suppressing layer 45.

The shunt film 50, the soft adjacent film 55, the signal read electrodes 60, the upper gap film 70 and the upper magnetic shield layer 80 are then formed successively, whereby the fabrication of the magnetoresistive head 300 has been completed. Their materials, film or layer thicknesses, forming techniques and working methods are as in the first embodiment, so that their description is omitted herein.

Figure 9:
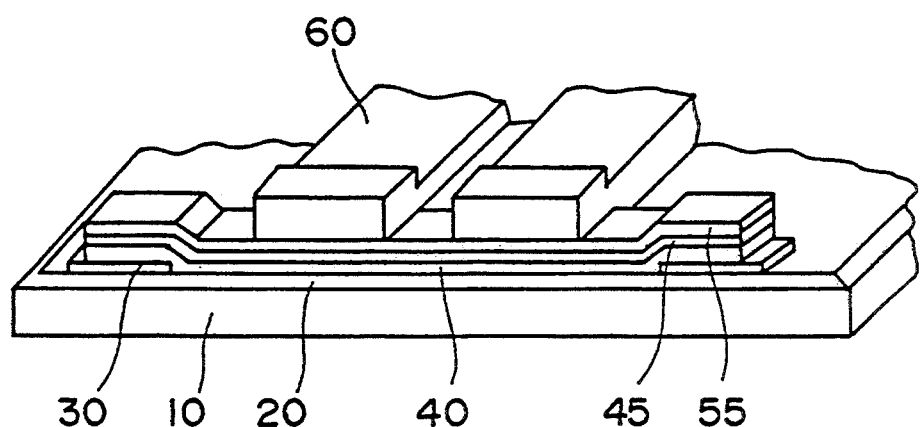
FIG. 9 is a fragmentary perspective view of a magnetoresistive head according to a fourth embodiment of the present invention.
Figure 10:
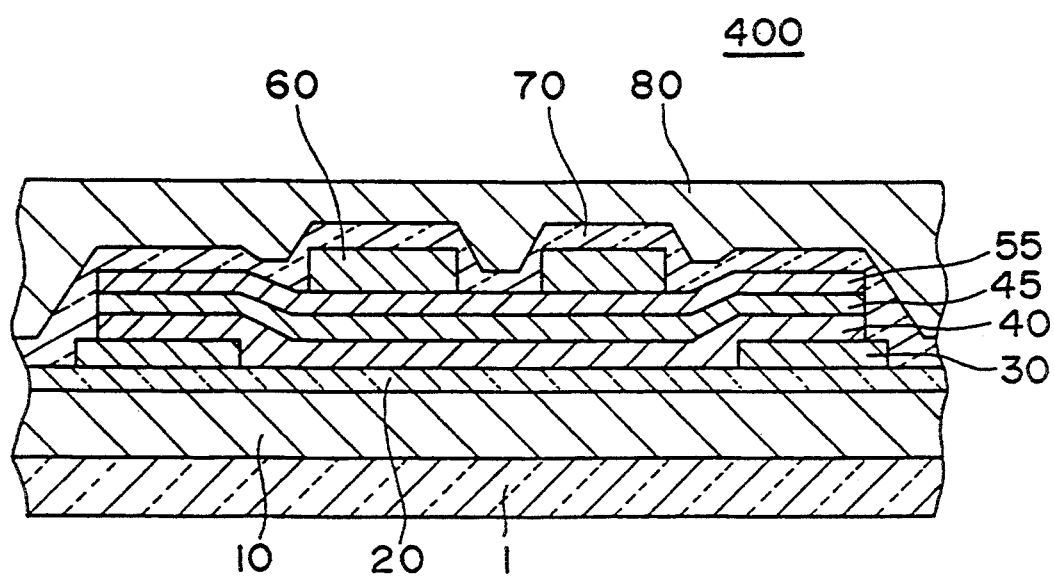
FIG. 10 is a fragmentary cross-sectional view of the magnetoresistive head depicted in FIG. 9.

Referring next to FIGS. 9 and 10, the magnetoresistive head according to the fourth embodiment of this invention, which is designated at numeral 400, will be described. In the magnetoresistive head 200 described above, employed for the second domain wall suppressing layer 45 was any one of the following antiferromagnetic materials: Cr-Mn alloys (1–50 atom% Mn), Cr-Al alloys (8–30 atom% Al), Cr-Ru alloys (2–13 atom% Ru), Cr-Re alloys (2–17 atom% Re), Cr-Mn-Fe alloys (1–50 atom% Mn, 0–10 atom% Fe), Cr-Mn-V alloys (1–50 atom% Mn, 0–4 atom% V), Cr-Al-Fe alloys (8–30 atom% Al, 0–14 atom% Fe), Cr-Al-V alloys (8–30 atom% Al, 0–5 atom% V), Ni-Mn alloys (40–60 atom% Mn), and Ni-Mn-Cr alloys (40–60 atom% Mn, 0–10 atom% Cr). These materials are conductors so that they can also serve as the shunt film 50. As is depicted in FIGS. 9 and 10, the second domain wall suppressing layer 45 in the magnetoresistive head 400 has the structure such that it also serves as a shunt film. The second domain wall suppressing layer 45 forms weak magnetic exchange coupling with the magnetoresistive film 40 to maintain the magnetism sensing portion of the magnetoresistive film 40 in the state of a single domain and, at the same time, serves as a shunt film to apply a transverse magnetic bias at a level sufficient to make the magnetoresistive film 40 highly sensitive. As a material for the second domain wall suppressing layer, the above-described antiferromagnetic conductor can be used like the second domain wall suppressing layer 45 of the magnetoresistive head 100. The functions and materials of the remaining respective layers or films are as in the magnetoresistive head 100 according to the first embodiment so that their description is omitted herein.

The magnetoresistive head 400 can prevent Barkhausen noise without lowering its detection sensitivity like the magnetoresistive heads 100, 200, 300. In addition, the magnetoresistive head 400 is more compact than the magnetoresistive heads 100, 200, 300 so that the structure of the magnetoresistive head 400 is suited for high-density magnetic recording. Further, the magnetoresistive head 400 does not require the formation of a shunt film in its fabrication process so that the magnetoresistive head 400 can be fabricated by a shorter fabrication process than the magnetoresistive heads 100, 200, 300. The magnetoresistive head 400 can therefore be fabricated at higher efficiency and reduced cost.

Detailed description of a process for the fabrication of the magnetoresistive head 400 is omitted herein as its fabrication process is similar to the fabrication process of the magnetoresistive head 100 described above with respect to the first embodiment except for the omission of the formation of the shunt film 50.

In each of the magnetoresistive heads 100, 200, 300 and 400 of the first, second, third and fourth embodiments described above, the three-layer film consisting of the antiferromagnetic film 302 and the ferromagnetic films 301,303 as shown in FIG. 8 was used as each first domain wall suppressing layer 30. Each first domain wall suppressing layer can also be formed using a film of a permanent magnetic material. Different from the utilization of the ferromagnet-antiferromagnet exchange coupling by the above-described three-layer film, the above alternative construction makes use of a strong magnetic flux produced by the permanent magnetic material to apply a longitudinal bias in the longitudinal direction of the magnetoresistive film 40. Co-Pt can be used as the permanent magnetic material. Its thickness generally ranges from 0.01 μm to 0.1 μm.

In each of the magnetoresistive heads 100, 200, 300 and 400 described above, the magnitude of the magnetic exchange coupling between the first domain wall suppressing layers 30 made of the Fe-Mn alloy and the magnetoresistive film 40 is 30 Oe(oersted) or greater. In contrast, the magnitude of the magnetic exchange coupling between the second domain wall suppressing layer 45 made of the above-described material, such as a Cr-Mn alloy, and the magnetoresistive film 40 is 1–5 Oe. The magnetic field of the longitudinal bias applied to the magnetism sensing portion of the magnetoresistive film 40 is conveniently small so that the reproduction sensitivity of the magnetoresistive head is not lowered.

Referring next to FIGS. 11, 12, 13 and 14, a description will be made of the magnetoresistive heads according to the fifth embodiment of this invention. These magnetoresistive heads are identified at numerals 1000, 2000, 3000 and 4000, respectively. In each of the magnetoresistive heads 1000, 2000, 3000 and 4000, opposite end portions of a magnetoresistive film 40 are bent and are disposed inside an air bearing surface. First domain wall suppressing layers 30 are also arranged inside the air bearing surface, accordingly. Only a central section of the magnetoresistive film 40, i.e., a magnetism sensing portion is exposed in the air bearing surface. With regard to the film construction, the magnetoresistive heads 1000, 2000, 3000 and 4000 correspond to the magnetoresistive heads 100, 200, 300 and 400, respectively.

By adopting such a structure, the first domain wall suppressing layers 30 are not exposed in the air bearing surface and, therefore, can be disposed at locations remote from a recording medium without exposure to the external environment. The adoption of the above-described structure can therefore shut off an Fe-Mn alloy of poor corrosion resistance from the external atmosphere when the Fe-Mn alloy is used for the first domain wall suppressing layers 30. Even when a Co-Pt alloy as a permanent magnet material is used for the first domain wall suppressing layers 30, the above structure makes it possible to arrange the Co-Pt alloy at locations remote from a recording medium. It is therefore possible to provide a practical magnetoresistive head which does not demagnetize recording media. The antiferromagnetic material employed for the second domain wall suppressing layer 45 has high corrosion resistance so that it need not be provided remote from the air bearing surface.

In the magnetoresistive film 40 in such a bent shape as is illustrated in FIG. 11, 12, 13 or 14, the direction of the longitudinal bias field applied to each of the first domain wall suppressing layers 30 on the opposite end portions of the magnetoresistive film 40 differs from the longitudinal direction of the central section of the magnetoresistive film 40 and is hence weakened, Magnetic poles therefore occur around each bent portion as a nucleus so that domain walls tend to occur. In the magnetoresistive heads 1000, 2000, 3000 and 4000 according to the fifth embodiment, however, the second domain wall suppressing layer 45 is also formed, in addition to the first domain wall suppressing layers 30, in contact with the central section of the magnetoresistive film 40. As a consequence, a weak longitudinal bias field is also directly applied to the central section of the magnetoresistive film 40. In each of the magnetoresistive heads 1000, 2000, 3000 and 4000 according to the fifth embodiment, no domain walls occur in the magnetoresistive film 40 because the second domain wall suppressing layers 45 prevent occurrence of magnetic poles despite the somewhat bent structure of the magnetoresistive film 40. It is accordingly possible to avoid Barkhausen noise despite the bent structure of the magnetoresistive film 40. Since the longitudinal bias applied by each second domain wall suppressing layer 45 is weak, the detection sensitivity of the magnetoresistive film 40 is not lowered as in the magnetoresistive heads 100, 200, 300 and 400 described above.

Figure 11:
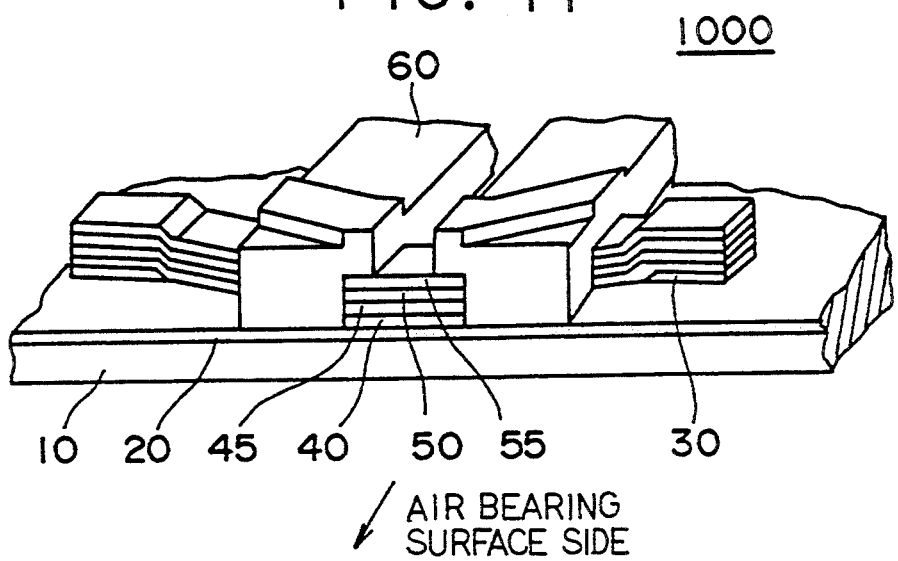
FIG. 11 is a fragmentary perspective view of a magnetoresistive head 1000 according to a fifth embodiment of the present invention.
Figure 12:
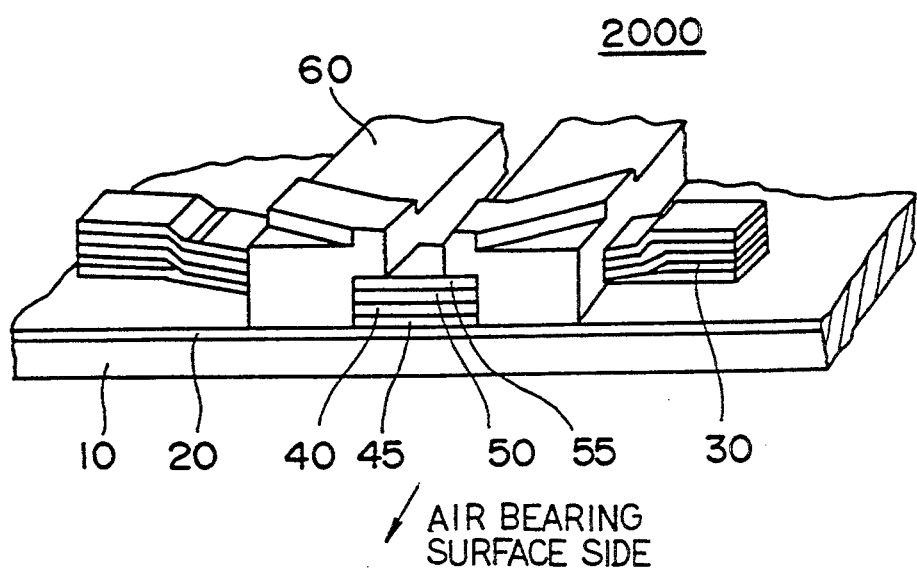
FIG. 12 is a fragmentary perspective view of a magnetoresistive head 2000 according to the fifth embodiment of the present invention.
Figure 13:
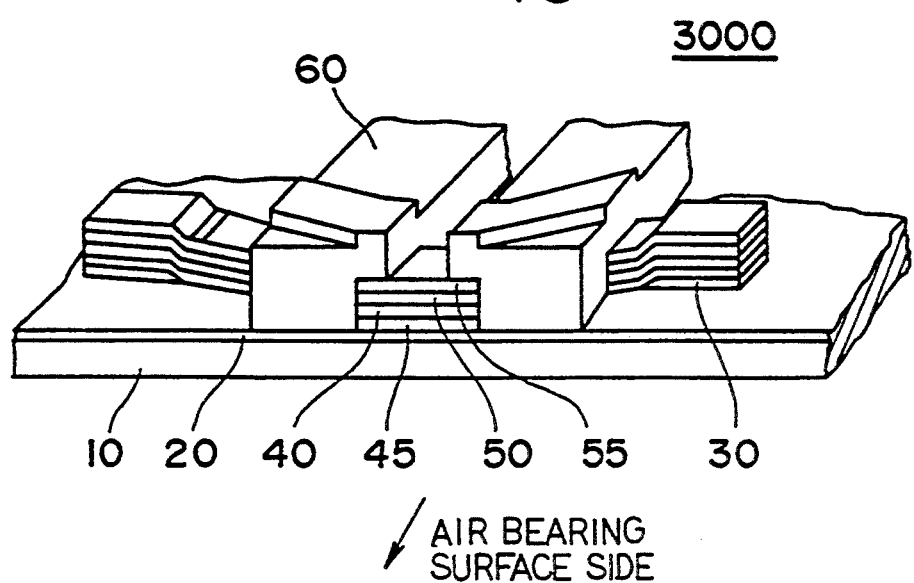
FIG. 13 is a fragmentary perspective view of a magnetoresistive head 3000 according to the fifth embodiment of the present invention.
Figure 14:
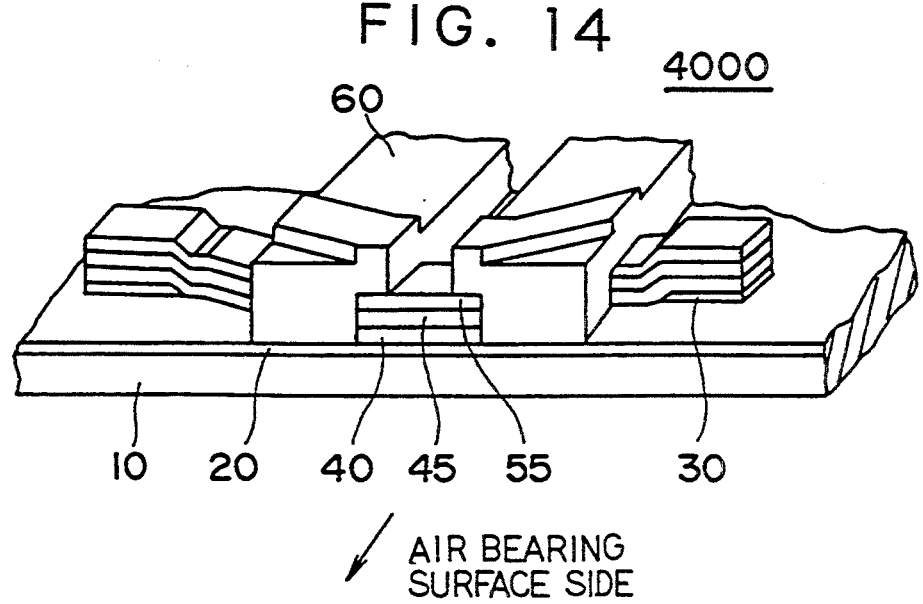
FIG. 14 is a fragmentary perspective view of a magnetoresistive head 4000 according to the fifth embodiment of the present invention.

In a process for the fabrication of each of the magnetoresistive heads 1000, 2000 and 3000 according to the fifth embodiment, the shapes of the magnetoresistive film 40, the second domain wall suppressing layers 45, the shunt film 50 and the soft adjacent film 55 are patterned as depicted in FIG. 11, 12 or 13. In the magnetoresistive head 4000, the shapes of the magnetoresistive film 40, the second domain wall suppressing layers 45 and the soft adjacent film 55 are patterned as shown in FIG. 14. The formation processes, functions, materials and film or layer thicknesses of the remaining respective films or layers are as in the above-described fabrication processes of the magnetoresistive heads 100, 200, 300 and 400 so that their description is omitted herein.

The magnetoresistive head according to the sixth embodiment of this invention will next be described with reference to FIG. 15. The magnetoresistive head according to the sixth embodiment is provided, as shown in FIG. 15, with a lower magnetic shield layer (not shown) on a substrate (not shown) and also with a lower gap film 20 on the lower magnetic shield layer. On opposite end portions of the lower gap film 20, first domain wall suppressing layers 30 are disposed and, on the lower gap film 20 and the first domain wall suppressing layers 30, a magnetoresistive film 40 about 1μm wide and in a bent shape is arranged with opposite ends thereof placed remote from an air bearing surface. Arranged successively on the magnetoresistive film 40 are a shunt film, a soft adjacent film, signal read electrodes, an upper gap film and an upper magnetic shield layer although they are not illustrated in the figure.

The materials and functions of the respective layers are similar to the materials and functions of the corresponding layers in the magnetoresistive head 200, so that their description is omitted herein. The magnetoresistive film 40 usually requires a width broader than 1 μm for the formation of domains. In the structure of the sixth embodiment, the width of the magnetoresistive film 40 is narrower than 1 μm so that the magnetoresistive film 40 cannot be brought into the state of multiple domains. The state of a single domain is therefore retained. Moreover, the first domain wall suppressing layers 30 are arranged on the opposite end portions of the magnetoresistive film 40 to apply a longitudinal bias. The single domain state of the magnetoresistive film 40 is therefore ensured further. The magnetoresistive head according to the sixth embodiment can therefore prevent Barkhausen noise. Further, a magnetism sensing portion of the magnetoresistive film 40 does not undergo any magnetic exchange coupling so that the detection sensitivity is not lowered.

Each first domain wall suppressing layer 30 is of the structure such that it is remote from the air bearing surface as in the magnetoresistive head 2000 already described above. Even when the first domain wall suppressing layers 30 are formed of an antiferromagnetic material such as an Fe-Mn alloy, the magnetoresistive head has good corrosion resistance. When the first domain wall suppressing layers 30 is formed of a permanent magnet material such as a Co-Pt alloy, there is no potential danger to demagnetize a recording medium. As the magnetoresistive head according to the sixth embodiment does not have any second domain wall suppressing layer, it can be fabricated simply by patterning the first domain wall suppressing layers 30 on the upper side of the lower gap film 20 at prescribed locations, successively forming the magnetoresistive film 40, the shunt film and the soft adjacent film one over another, and then patterning the films into the shapes shown in FIG. 15. It is therefore possible to omit the step for the formation of the second domain wall suppressing layers. Accordingly, the fabrication efficiency can be improved and the fabrication cost can be reduced.

Although the magnetoresistive film 40 of about 1 μm in width was used in the sixth embodiment described above, the width of the magnetoresistive film 40 is not limited to the above width. The magnetoresistive film 40 can read signals of a recording medium as long as it has a slight width. The magnetoresistive film 40 is therefore required to have only a minimum formable width. As the magnetoresistive film 40 is patterned by photolithography in the sixth embodiment, the magnetoresistive film 40 is required only to have a width as narrow as about 0.3 μm which is the minimum width formable by photolithography.

Referring next to FIG. 16, the magnetoresistive head according to the seventh embodiment of this invention will be described. As is illustrated in the drawing, the magnetoresistive head according to the seventh embodiment is provided with a lower magnetic shield layer (not shown) formed on a substrate (not shown), and a lower gap film 20 is formed on the lower magnetic shield layer. On opposite end portions of the lower gap film 20, first domain wall suppressing layers 30 are disposed about 1 μm remote from an air bearing surface, respectively. A magnetoresistive film 40 is arranged on the lower gap film and the first domain wall suppressing layers. Although not shown in the drawing, a shunt film, a soft adjacent film, signal read electrodes, an upper gap film and an upper magnetic shield layer are arranged further on the magnetoresistive film 40.

The materials and functions of the respective layers or films are similar to those of the corresponding layers or films in the magnetoresistive head 200, so that their description is omitted herein. In the seventh embodiment, the magnetoresistive film 40 is maintained in the state of a single domain by a strong longitudinal bias field applied by the first domain wall suppressing layers 30 which are formed on the opposite end portions of the magnetoresistive film 40, respectively. Magnetic spires in a portion of the magnetoresistive film 40, said portion extends up to a width of 1 μm from the air bearing surface, are relatively free so that they tend to orient in a stable direction, namely, in a direction opposite to the direction in which the spins in the magnetoresistive film are guided by the first domain wall suppressing layer 30. To form a magnetic domain oriented in the opposite direction, the width of the magnetoresistive film 40 up to which the magnetoresistive film 40 contains free spins is required to be greater than at least 1 μm. The magnetoresistive film 40 therefore cannot form any magnetic domain. Where the first domain wall suppressing layers 30 are formed at locations remote by not greater than 1 μm from the air bearing surface, respectively, as described above, the magnetic spins in the magnetoresistive film 40 are oriented in the same direction by the strong longitudinal bias field applied by the first domain wall suppressing layers 30 so that the magnetoresistive film 40 is maintained in the state of a single domain. The magnetoresistive head according to the seventh embodiment therefore can prevent Barkhausen noise. Further, a magnetism sensing portion of the magnetoresistive film 40 does not undergo any magnetic exchange coupling so that the detection sensitivity is not lowered.

Since the first domain wall suppressing layers 30 have the structure such that they are arranged remote from the air bearing surface as in the magnetoresistive head 2000 already described above, the magnetoresistive head according to the seventh embodiment has good corrosion resistance and has no potential danger of demagnetizing recording media like the magnetoresistive head according to the sixth embodiment. Also similarly to the sixth embodiment, the magnetoresistive head according to the seventh embodiment is not provided with any second domain wall suppressing layer so that the fabrication efficiency can be improved and the fabrication cost can be reduced. Moreover, the magnetoresistive film 40 has a simple shape so that its patterning can be conducted with ease.

Like the magnetoresistive heads 100, 200, 300 and 400, it is possible to provide the magnetoresistive head according to the seventh embodiment with a second domain wall suppressing layer. This modification can prevent the occurrence of magnetic poles in the magnetoresistive film 40 even if the magnetoresistive film 40 contains some roughness, impurities and/or vacancy.

In each of the fifth, sixth and seventh embodiments described above, the first domain wall suppressing layers 30 are only required to be disposed inwardly remote by about 1 μm or more from the air bearing surface. End faces of the first domain wall suppressing layers are therefore fully covered by the layers disposed on the upper and lower sides thereof so that the end faces are not exposed in the air bearing surface. As a consequence, it is possible to avoid corrosion of the domain wall suppressing layer 30 and also demagnetization of recording media. In each of the fifth and sixth embodiments, the opposite end portions of the magnetoresistive film 40 are disposed remote from the air beating surface because of the arrangement of the first domain wall suppressing layers 30, whereby the magnetoresistive film 40 has a bent shape. Since the occurrence of each magnetic domain in the magnetoresistive film 40 is dependent upon the width of the magnetoresistive film 40 or its bent shape, the interval and structure of the paired first domain wall suppressing layers 30 can be adequately designed by determining the occurrence of each magnetic domain through calculation or experimentation.

What is claimed is:

1. A magnetoresistive head comprising:

a magnetoresistive film, made of a ferromagnetic material, for converting an applied magnetic field into an electrical signal by using magnetoresistance effects;

a pair of electrodes for causing a signal detection current to flow through said magnetoresistive film;

a pair of first domain wall suppressing layers arranged at opposite end portions of said magnetoresistive film, respectively, to apply a longitudinal magnetic bias to said magnetoresistive film; and a second domain wall suppressing layer arranged in a position to contact at least a center portion of said magnetoresistive film to apply a longitudinal magnetic bias, which is weaker compared with the longitudinal magnetic bias applied by said first domain wall suppressing layers, to said magnetoresistive film to maintain said magnetoresistive film in a single domain state, thereby preventing generation of Barkhausen noise.

2. The head of claim 1, wherein said second domain wall suppressing layer is arranged at least at a magnetism sensing portion where said magnetoresistive film reads the magnetic signal.

3. The head of claim 1, further comprising a magnetic shield layer to provide a magnetic shield and a gap film formed on said magnetic shield layer for insulating said magnetic shield layer, said second domain wall suppressing layer being formed on said gap film, said paired first domain wall suppressing layers being disposed at an interval therebetween on said second domain wall suppressing layer, and said magnetoresistive film being provided on said second domain wall suppressing layer between said paired first domain wall suppressing layers with said opposite end portions of said magnetoresistive film being maintained in contact with said first domain wall suppressing layers, respectively.

4. The head of claim 1, further comprising a magnetic shield layer to provide a magnetic shield and a gap film formed on said magnetic shield layer for insulating said magnetic shield layer, said paired first domain wall suppressing layers being provided at an interval therebetween on said gap film, said second domain wall suppressing layer being provided on said gap film between said paired first domain wall suppressing layers with opposite ends of said second domain wall suppressing layer being maintained in contact with said first domain wall suppressing layers, respectively, and said magnetoresistive film being disposed on said second domain wall suppressing layer.

5. The head of claim 1, wherein said second domain wall suppressing layer is made of an alloy or oxide selected from the group consisting of Cr-Mn alloys, Cr-Al alloys, Cr-Ru alloys, Cr-Re alloys, Cr-Mn-Fe alloys, Cr-Mn-V alloys, Cr-Al-Fe alloys, Cr-Al-V alloys, Ni-Mn alloys, Ni-Mn-Cr alloys, nickel oxide and hematite.

6. The head of claim 1, further comprising a magnetic shield layer to provide a magnetic shield and a gap film formed on said magnetic shield layer for insulating said magnetic shield layer, said paired first domain wall suppressing layers being provided at an interval therebetween on said gap film, said magnetoresistive film being provided on said gap film between said paired first domain wall suppressing layers with said opposite ends of said magnetoresistive film being maintained in contact with said first domain wall suppressing layers, respectively, and said second domain wall suppressing layer being disposed on said magnetoresistive film.

7. The head of claim 6, wherein said second domain wall suppressing layer also serves as a shunt film for applying a transverse magnetic bias to said magnetoresistive film.

8. The head of claim 6, further comprising a soft adjacent film provided on said second domain wall suppressing layer to apply a transverse magnetic bias to said magnetoresistive film.

9. The head of claim 6, further comprising a shunt film provided on said second domain wall suppressing layer to apply a transverse magnetic bias to said magnetoresistive film and a soft adjacent film provided on said shunt film to apply a transverse magnetic bias to said magnetoresistive film.

10. The head of claim 6, wherein said second domain wall suppressing layer is made of an alloy selected from the group consisting of Cr-Mn alloys, Cr-Al alloys, Cr-Ru alloys, Cr-Re alloys, Cr-Mn-Fe alloys, Cr-Mn-V alloys, Cr-Al-Fe alloys, Cr-Al-V alloys, Ni-Mn alloys, and Ni-Mn-Cr alloys.

11. The head of claim 1, wherein a magnetization direction of the magnetoresistive film rotates in response to the applied magnetic field.

12. A magnetic disc system comprising:
a magnetoresistive head;
a magnetic disc; and
drive means for rotating said magnetic disc;
wherein said magnetoresistive head includes
a magnetoresistive film made of a ferromagnetic material,
a pair of electrodes for causing a signal detection current to flow through said magnetoresistive film,
a pair of first domain wall suppressing layers arranged at opposite end portions of said magnetoresistive film to apply a longitudinal magnetic bias to said magnetoresistive film, and
a second domain wall suppressing layer arranged in a position to contact at least a center portion of said magnetoresistive film to apply a longitudinal magnetic bias, which is weaker compared with the longitudinal magnetic bias applied by said first domain wall suppressing layers, to said magnetoresistive film to maintain said magnetoresistive film in a single domain state, thereby preventing generation of Barkhausen noise.

13. The magnetic disc system of claim 12, wherein a magnetization direction of the magnetoresistive film rotates in response to an applied magnetic field.

14. A magnetoresistive head comprising:
a magnetoresistive film for converting a magnetic signal into an electrical signal using magnetoresistance effects, the magnetoresistive film being made of a ferromagnetic material and having a center portion and opposite end portions on either side of the center portion;

two first domain wall suppressing layers respectively disposed at the opposite end portions of the magnetoresistive film for applying a first longitudinal magnetic bias to the magnetoresistive film to establish a single domain state in the magnetoresistive film; and a second domain wall suppressing layer disposed in contact with at least the center portion of the magnetoresistive film for applying a second longitudinal magnetic bias weaker than the first longitudinal magnetic bias to the magnetoresistive film to maintain the magnetoresistive film in the single domain state, thereby preventing generation of Barkhausen noise.

15. A magnetoresistive head according to claim 14, wherein the center portion of the magnetoresistive film includes a magnetic signal sensing portion for sensing the magnetic signal; and
wherein the second domain wall suppressing layer is disposed in contact with at least the magnetic signal sensing portion.

16. A magnetoresistive head according to claim 14, further comprising:
a magnetic shield layer; and
an insulating gap film disposed on the magnetic shield layer;
wherein the second domain wall suppressing layer is disposed on the insulating gap film,
the first domain wall suppressing layers are disposed with an interval therebetween on the second domain wall suppressing layer, and
the magnetoresistive film is disposed at least on the second domain wall suppressing layer between the first domain wall suppressing layers with the opposite end portions of the magnetoresistive film respectively contacting the first domain wall suppressing layers.

17. A magnetoresistive head according to claim 14, further comprising:
a magnetic shield layer; and
an insulating gap film disposed on the magnetic shield layer;
wherein the first domain wall suppressing layers are disposed with an interval therebetween on the insulating gap film,
the second domain wall suppressing layer is disposed at least on the insulating gap film between the first domain wall suppressing layers with opposite end portions of the second domain wall suppressing layer respectively contacting the first domain wall suppressing layers, and
the magnetoresistive film is disposed on the second domain wall suppressing layer.

18. A magnetoresistive head according to claim 14, wherein the second domain wall suppressing layer is made of an alloy or an oxide selected from the group consisting of Cr-Mn alloys, Cr-Al alloys, Cr-Ru alloys, Cr-Re alloys, Cr-Mn-Fe alloys, Cr-Mn-V alloys, Cr-Al-Fe alloys, Cr-Al-V alloys, Ni-Mn alloys, Ni-Mn-Cr alloys, nickel oxide, and hematite.

19. A magnetoresistive head according to claim 14, further comprising:
a magnetic shield layer; and
an insulating gap film disposed on the magnetic shield layer;
wherein the first domain wall suppressing layers are disposed with an interval therebetween on the insulating gap film,
the magnetoresistive film is disposed at least on the insulating gap film between the first domain wall suppressing layers with the opposite end portions of the magnetoresistive film respectively contacting the first domain wall suppressing layers, and
the second domain wall suppressing layer is disposed on the magnetoresistive film.

20. A magnetoresistive head according to claim 19, wherein the second domain wall suppressing layer also serves as a shunt film for applying a transverse magnetic bias to the magnetoresistive film.

21. A magnetoresistive head according to claim 19, further comprising a soft adjacent film disposed on the second domain wall suppressing layer for applying a transverse magnetic bias to the magnetoresistive film.

22. A magnetoresistive head according to claim 19, further comprising:
a shunt film disposed on the second domain wall suppressing layer for applying a transverse magnetic bias to the magnetoresistive film; and
a soft adjacent film disposed on the shunt film for applying a transverse magnetic bias to the magnetoresistive film.

23. A magnetoresistive head according to claim 19, wherein the second domain wall suppressing layer is made of an alloy selected from the group consisting of Cr-Mn alloys, Cr-Al alloys, Cr-Ru alloys, Cr-Re alloys, Cr-Mn-Fe alloys, Cr-Mn-V alloys, Cr-Al-Fe alloys, Cr-Al-V alloys, Ni-Mn alloys, and Ni-Mn-Cr alloys.

24. A magnetoresistive head according to claim 14, wherein the magnetoresistive film has a magnetization direction which rotates in response to the magnetic signal.

25. A magnetic disc system comprising:
a magnetic disc;
drive means for rotating the magnetic disc; and
a magnetoresistive head opposing the magnetic disc, the magnetoresistive head including:
a magnetoresistive film for converting a magnetic signal into an electrical signal using magnetoresistance effects, the magnetoresistive film being made of a ferromagnetic material and having a center portion and opposite end portions on either side of the center portion;
two first domain wall suppressing layers respectively disposed at the opposite end portions of the magnetoresistive film for applying a first longitudinal magnetic bias to the magnetoresistive film to establish a single domain state in the magnetoresistive film; and
a second domain wall suppressing layer disposed in contact with at least the center portion of the magnetoresistive film for applying a second longitudinal magnetic bias weaker than the first longitudinal magnetic bias to the magnetoresistive film to maintain the magnetoresistive film in the single domain state, thereby preventing generation of Barkhausen noise.

26. A magnetic disc system according to claim 25, wherein the magnetoresistive film has a magnetization direction which rotates in response to the magnetic signal.

* * * * *